March 3, 1931.  J. W. CANNON  1,794,442
VALVE
Filed Jan. 9, 1928
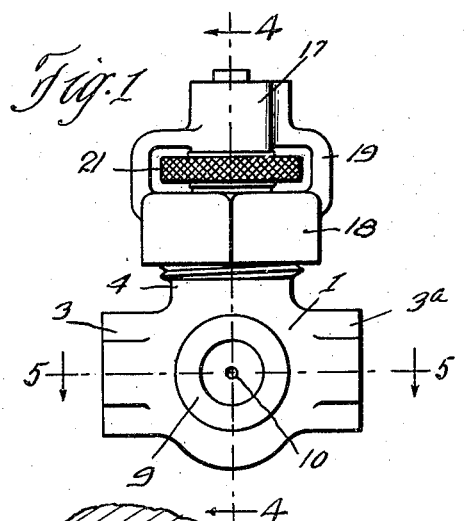
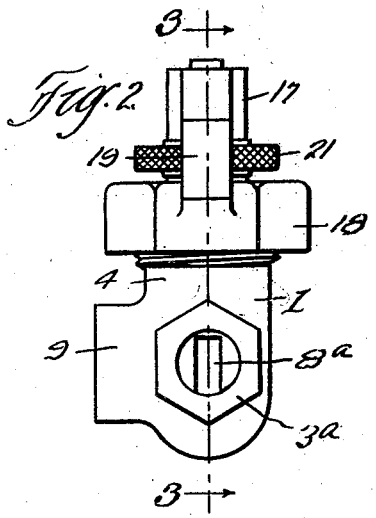
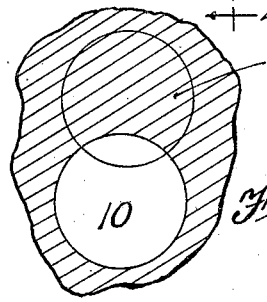
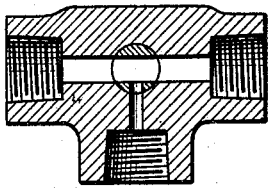
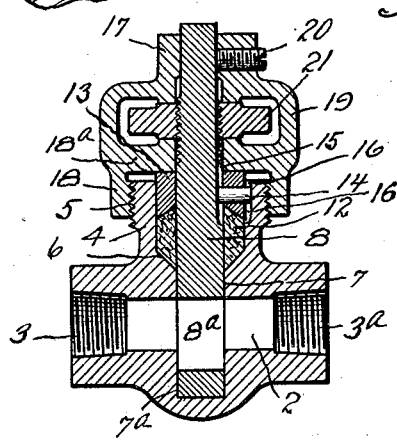
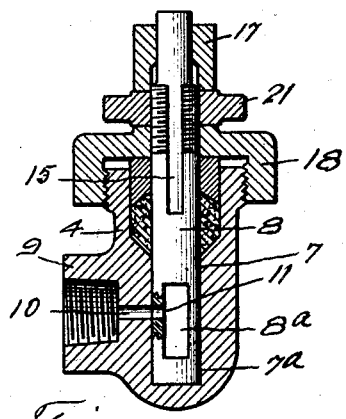

Patented Mar. 3, 1931

1,794,442

UNITED STATES PATENT OFFICE

JOHN W. CANNON, OF PROVIDENCE, RHODE ISLAND

VALVE

Application filed January 9, 1928. Serial No. 245,360.

This invention relates to valves of the type that are known to the trade as rising-stem valves, wherein the flow of fluid through such valve is controlled by raising and lowering a valve stem provided with a port adapted to register with a passage in the valve body.

It is the general purpose and object of the invention to provide a valve of this character which is efficient in operation and which may be conveniently and accurately adjusted; also to provide such valve with cooperating construction of valve-body port and valve-stem port that will prevent the clogging by sediment of the passage provided by said ports.
A still further object of the invention is to improve and simplify the construction of valves of this character.

I accomplish the foregoing and other objects by means of the construction and arrangement of parts shown in the drawings, wherein Fig. 1 represents a side elevation of a valve constructed in accordance with my invention; Fig. 2 a side elevation taken at right angles to Fig. 1; Fig. 3 a detail in vertical section taken on the line 3—3 of Fig. 2; Fig. 4 a view similar to Fig. 3, taken on the line 4—4 of Fig. 1; Fig. 5 a detail in section taken on the line 5—5 of Fig. 1; and Fig. 6 is a fragmentary section showing the intersection of the ports 10 and 11 in an intermediate position.

Describing the various parts herein by reference characters, 1 denotes the valve body generally, the same being in the form of a T having a longitudinal bore 2 therethrough, the ends of which bore terminate in connections 3 and 3ª, said connections being internally threaded for the reception of pipes (not shown). From the upper part of the body there extends a sleeve 4 having its upper end externally threaded, as shown at 5, the sleeve having therein a chamber, the bottom of which is tapered, as shown at 6, toward a bore or guide 7 for the valve stem 8, which stem crosses the bore 2, the lower end of said stem being received within a seat 7ª provided by the bottom of the bore 7 below the bore 2.

Extending at right angles to the connections 3 and 3ª is an outlet connection 9 having its interior threaded for the reception of a pipe (not shown). From such connection a port 10 extends to the vertical bore 7 provided in the valve body 1, the valve stem being provided with a port 11 adapted to register at its outer end with the port 10 and registering at its inner end with a large through channel 8ª which communicates with the bore 2.

Both of the ports 10 and 11 are circular in cross section, and the advantages of this shape will be pointed out hereinafter.

12 denotes packing material in the sleeve 4 and surrounding the valve stem, the said material being held in place and compressed by means of a gland 13 through which the valve stem extends, the said stem being held against rotation in the sleeve 4 by means of a pin 14 extending through the gland and having its ends mounted in vertical slots 15 and 16 in the said stem and in the inner wall of the sleeve 4, respectively.

17 denotes the upper sleeve portion and 18 the lower cap portion of a yoke cap, said portions being connected by yoke arms 19. The cap portion 18 comprises a depending internally threaded skirt which is adapted to be threaded on the upper end of the sleeve 4 and a transverse partition 18ª having an aperture therethrough for the stem 8, said partition being adapted to engage the gland 13 and cause the same to compact the packing 12. The upper portion 17 of the yoke cap is provided with a bore for the upper end of the valve stem and also with a transverse bore 17ª which receives a set screw 20 which, when tightened, will cooperate with the pin 14 to hold the valve stem against rotation by the operation of the control nut 21 which is threaded upon the stem 8 between the parts 17 and 18 of the yoke cap. This control nut is of a width to be received between the upper and lower portions of the yoke cap and has upper and lower thrust surfaces adapted to engage corresponding thrust surfaces on the bottom of the part 17 and on the top of the part 18, thereby to facilitate the vertical adjustments of the valve stem by said nut.

The threads on the valve stem and within the bore of the control nut are very fine, whereby the oil supplied through the passage formed by the ports 10 and 11 may, if desired, be varied by a few drops per minute. The fine threads provide in effect a micrometer motion of the stem 8. The adjustment of the stem 8 does not alter the cross-sectional area of the opening between the channel 8$^a$ and the duct 2. This will be seen by an examination of Figures 3 and 4. The stem 8 is there shown in its lowest position and the ports 10 and 11 register, constituting the position of maximum flow of oil through these ports. To shut off the flow through ports 11 and 10 the stem 8 is raised. This operation evidently does not change appreciably the flow through the duct 2 since by reason of the rectangular channel 8$^a$ the openings between the channel 8$^a$ and the bore 2 remain of the same cross-sectional area and since the cross-sectional area of the opening between the ports 10 and 11 is always small as compared with the cross-sectional area of the stream through 2 and 8$^a$. The bore 2 constitutes a by-pass with respect to the openings 10, 11 (through which the oil that is delivered to the furnace passes).

A valve of this character is particularly useful in systems or apparatus for supplying oil to burners, and the construction described enables the valve stem to be set for the maximum desired fire, after which the yoke cap may be locked in place by means of the set screw 20, which will prevent reciprocation of the valve stem by the control nut 21.

It will be observed that, in all adjustments of the valve stem 8, a lenticular opening will be provided between the ports 10 and 11 for the flow of the oil. This continuous lenticular cross-sectional area is particularly efficient, not only in enabling a sensitive control to be obtained, but also in the matter of preventing the clogging of such opening and of the passage formed by said ports by the liquid flowing therethrough. This lenticular cross sectional area is not only distinguishable from the diffused area which is provided between a needle valve and its seat, but secures results which cannot be obtained by a port or passage having such diffused area. By a "lenticular" section is understood an area which is common to two intersecting circles.

The opening between the ports 10 and 11, as well as the said ports, is continuously washed by the flowing oil, which tends to prevent any accumulation of sediment. Furthermore, the sediment contained in a stream of liquid flowing through a passage tends to seek the center of such stream; and, as the opening formed by adjusting the stem with reference to the port 10 is located at one side of the center of the stream, it will receive a minimum of such sediment. The sediment, if light, tends to move along the line of greatest velocity, that is in the center of the channel, or if heavy tends to go to the bottom. The port 11 is shown in Fig. 4 as located to one side of a vertical plane bisecting the rectangle 8$^a$. Hence the oil that trickles through the small opening 11 is not likely to be clogged with either heavy or light sediment.

As will be seen from Fig. 3 of the drawing, because the channel 8$^a$ extends below the bore 2 and has its upper end substantially flush with the top of the bore when in this position, the adjustment of the valve stem 8 upwardly by the control nut 21, to vary the effective passageway through the ports 10 and 11 will not result in varying the effective size of the passageway through the bore 2 and channel 8$^a$. The raising of the stem 8 does not affect the area of the opening between the channel 8$^a$ and the bore 2. The raising of the stem creates an upper oil pocket of increasing volume, but it also decreases the volume of the lower oil pocket. Hence the resistance to the flow of oil parallel to the bore 2 is not seriously changed.

The valve described herein is extremely efficient in operation, for the reasons set forth, and is comparatively cheap of production.

Having thus described my invention, what I claim is:

1. A valve comprising a body having a connection and a vertical guideway for a valve stem and a port extending from said connection to said guideway, a valve stem slidably mounted in said guideway and having a port adapted to register with the first mentioned port, the said valve body having a sleeve providing a chamber surrounding the upper portion of the valve stem, a yoke cap having a guideway for the upper end of said stem and being threaded on said sleeve, packing within the sleeve surrounding the valve stem, a packing gland in said sleeve adapted to be engaged by said yoke cap, there being yoke arms connecting the upper and lower portions of said cap and the said stem being provided with a threaded portion extending between the upper and lower portions of the yoke cap, a nut on said stem between the upper and lower portions of said cap, and means for holding the stem against rotation while being reciprocated by said nut.

2. A valve comprising a body having a connection and a guideway for a valve stem and a port extending from said connection to said guideway, a valve stem slidably mounted in said guideway and having a port adapted to register with the first-mentioned port, a yoke cap connected to said body and having a guideway for the upper end of said stem, there being yoke arms connecting the upper and lower portions of said cap, the said stem being provided with a threaded portion extending between the upper and lower portions of the yoke cap, a nut on said stem between the upper and lower portions of said cap, and means for holding the stem against rotation while being reciprocated by said nut.

3. A valve comprising a body having a port for the flow of liquid and a guideway intersecting the said port, a valve stem mounted in said guideway and having a port adapted to register with the first mentioned port, the said valve body having a sleeve extending therefrom providing a chamber surrounding the valve stem, there being packing in said chamber, a gland surrounding the valve stem and adapted to engage the said packing, the valve stem and the inner wall of the sleeve being slotted, a pin extending through the gland and having its ends mounted in said slots, a cap threaded on said sleeve and surrounding the stem and adapted to force the gland against said packing, the said stem being provided with a thread, and a control nut on the threaded part of said stem arranged to engage said cap.

4. A valve comprising a body having a port for the flow of liquid and a guideway intersecting the said port, a valve stem mounted in said guideway and having a port adapted to register with the first mentioned port, the said valve body having a sleeve extending therefrom providing a chamber surrounding the valve stem, there being packing in said chamber, a gland surrounding the valve stem and adapted to engage the said packing, the valve stem and the inner wall of the sleeve being slotted, a pin extending through the gland and having its ends mounted in said slots, a cap threaded on said sleeve and surrounding the stem and adapted to force the gland against said packing, the said cap comprising yoke arms extending from the portion threaded on said sleeve with a valve-stem engaging portion beyond said yoke arms, and a control nut threaded on said stem between the upper and lower portions of the said cap, said upper and lower portions being provided with thrust surfaces for said nut.

5. A valve comprising a body having a port for the flow of liquid and a guideway intersecting the said port, a valve stem mounted in said guideway and having a port adapted to register with the first mentioned port, the said valve body having a sleeve extending therefrom providing a chamber surrounding the valve stem, there being packing in said chamber, a gland surrounding the valve stem and adapted to engage the said packing, the valve stem and the inner wall of the sleeve being slotted, a pin extending through the gland and having its ends mounted in said slots, a cap threaded on said sleeve and surrounding the stem and adapted to force the gland against said packing, and a control nut threaded on said stem to cooperate with said cap for moving the stem in said guideway.

6. A valve comprising a valve body having a guide, a valve stem mounted for reciprocation in said guide, said valve body having an inlet and outlet for the continuous flow of oil through a channel in said valve stem and a second outlet for the flow of oil as regulated by the position of the valve stem, said valve stem and said valve body having ports of substantially circular cross-section for connecting said channel and said second outlet by means of an opening formed by the intersection of the contacting adjacent ends of the walls of the two ports, and means for reciprocating the valve stem whereby the area of opening may be minutely regulated.

7. A valve comprising a valve body having a duct for the continuous flow of oil, a guide intersecting said duct, a valve stem mounted for reciprocation in said guide and having a channel forming a part of said duct, said valve body having also an outlet for receiving oil from said continuous flow in amounts variable by movement of the valve stem, said channel and said outlet for variable oil flow being interconnected by ports in said stem and in said valve body respectively by means of the opening formed by the intersection of the adjacent ends of the walls of the two ports, said opening being to one side of the axis of the duct for continuous flow whereby tendency to clogging the ports by débris from the main stream is reduced.

In testimony whereof, I hereunto affix my signature.

JOHN W. CANNON.